Dec. 12, 1939.    J. TURPAN    2,182,953
INSEAM MEASURING DEVICE
Filed May 10, 1939
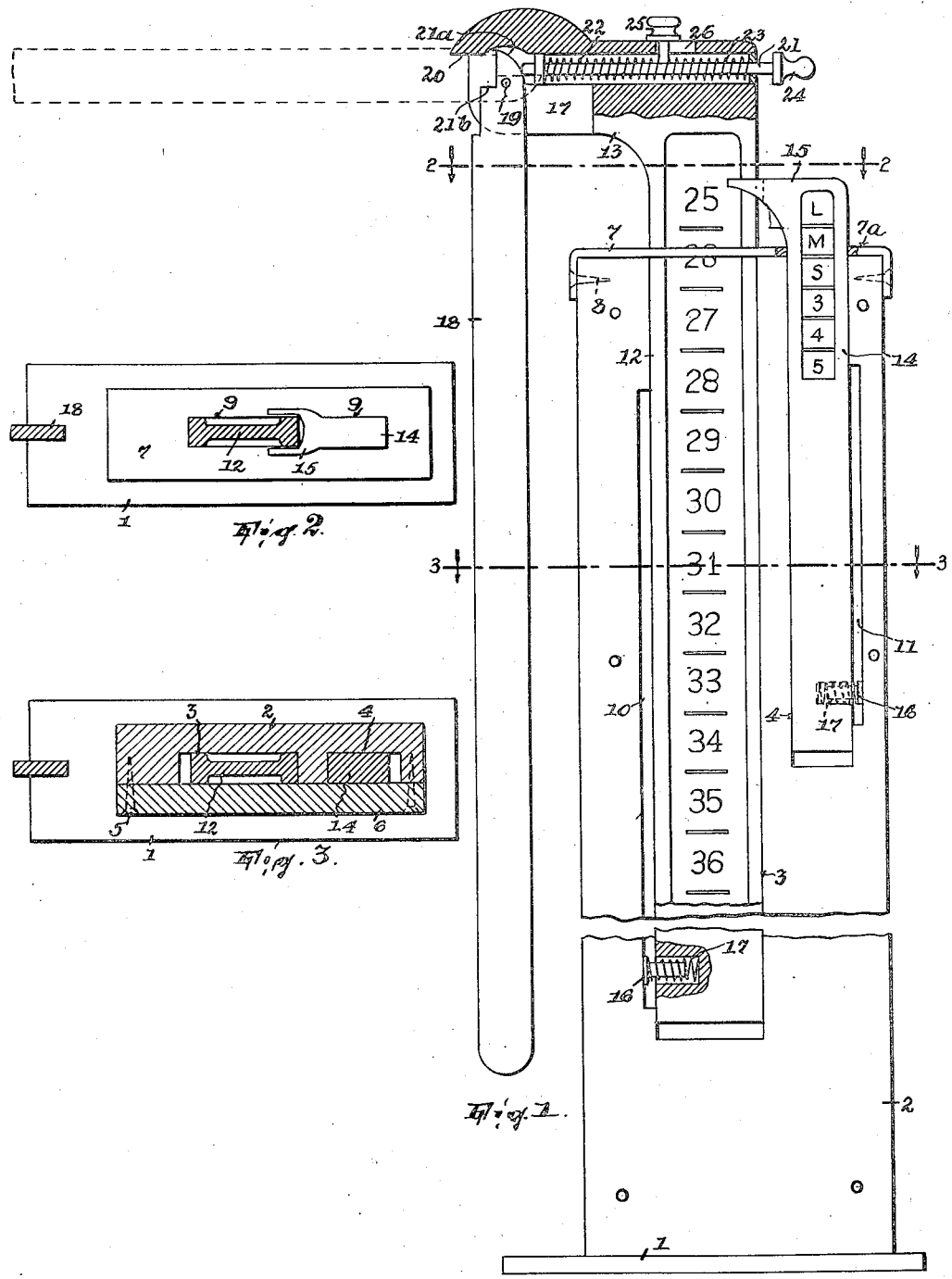
INVENTOR,
James Turpan,
BY
John W. Steward.
ATTORNEY.

UNITED STATES PATENT OFFICE 2,182,953

INSEAM MEASURING DEVICE

James Turpan, Paterson, N. J.

Application May 10, 1939, Serial No. 272,827

2 Claims. (Cl. 33—8)

In my application Serial No. 186,277 I have disclosed a tailor's measuring apparatus for taking certain vertical measurements in respect to garments, as the inseam measurement of a customer when fitted with a pair of trousers, whereby, when the garment is to hang a specified distance from the floor, allowance may be taken for that condition in calculating the length of the garment. In that case, given fixed structure, there is a vertically movable scale plunger having a measurement scale whose characters read upwardly and an allowance scale below the measurement scale and whose characters read downwardly, and there are a gauge plunger vertically movable and coactive with the measurement scale as a pointer and a pointer on the fixed structure coactive with the allowance scale. To take a measurement with allowance the operator has to raise the scale plunger to some sufficiently elevated position which will provide for the allowance and where this plunger is then suitably held and then raise the gauge plunger to the crotch of the customer, who straddles the gauge plunger, noting on the measurement scale with what index thereof the pointer of the gauge plunger coincides.

According to the present invention the construction, generally stated, is as follows: In the fixed structure is movable vertically for the purpose of taking each measurement a scale plunger having the indices of its scale reading downwardly, such plunger having a portion, preferably adapted to stand when not in use in pendant state, which the customer straddles. An auxiliary plunger is vertically guided in said structure and it has an allowance scale whose indices also read downwardly and with which scale some point on said structure coacts as a pointer, such plunger itself having a pointer which coacts with the measurement scale. This construction makes it possible to have the two critical points on the two scales—i. e., the points contiguous to the pointers respectively coinciding therewith with both plungers raised to the required extent for the measurement—in closer proximity to each other than in the case of the construction of my said application, where the critical point on the scale plunger will usually stand considerably removed vertically from the critical point on the allowance plunger, wherefore errors in measurement can only be avoided by exceeding care on the part of the tailor. Further, the operation of the present apparatus is simplified and the construction also rendered less cumbersome when the parts are in the state for taking a measurement. In practice the auxiliary plunger protrudes and has its pointer above the fixed structure and the pointer for the allowance scale is the top of such structure.

In the drawing,

Fig. 1 is a side elevation of the present apparatus, partly in section and with slab 6 removed; and Figs. 2 and 3 are sections on lines 2—2 and 3—3, Fig. 1.

Fixed to a base 1 is an upright forming therewith fixed structure and itself formed as follows: A thick wood slab 2 is formed at one face with a pair of vertical grooves 3 and 4 close together. To this slab is held by screws 5 a thinner slab 6 otherwise of the same dimensions as slab 2. Both grooves terminate short of the lower end of the fixed structure, groove 4 being appreciably the shorter. A metal plate 7 caps the upright, being held thereto by screws 8, the same having apertures 9 of the same cross-section shape and size as the grooves. The slab 2 is formed with counter-grooves 10 and 11 at the relatively remote sides of the grooves.

In groove 3 is vertically guided the shank 12 of a scale plunger having a head 13 projecting laterally away from the groove 4; this has a scale whose indices, from "25" to "36", read downwardly. In groove 4 slides the shank 14 of the auxiliary plunger having a head 15 which projects in the same direction as head 13, being forked to straddle the scale plunger; this has a scale whose indices "L", "M", "S", "3", "4", "5", read downwardly. (The characters "L", "M", and "S" are for long, medium and short, respectively, and "3", "4" and "5" indicate the inches the trousers may hang short of the floor.) A counterpart of the scale appearing on each plunger may be provided on its opposite face. Each plunger, by closely fitting the upper end of the bore in the upright which results from providing the corresponding groove covered by the slab 6, is confined to rectilineal movement and when raised to some elevation it is frictionally held there by a spring-pressed plug 16 set in a recess 17 in the plunger and bearing against the bottom of the corresponding groove 10 or 11; complete withdrawal of the plunger in either case is prevented by such stud abutting the upper end of such corresponding groove. The pointer for the scale of plunger 12 is afforded by the forked head of the auxiliary plunger; the pointer for the auxiliary plunger is afforded by the top face 7a of the plate 7.

The projecting head 13 of the scale plunger has an underneath slot 17 receiving one end of an arm or extension 18 supported on a pivot 19 in said head; said arm may be swung up to horizontal position or until it engages a stop at 20. Any means for releasably holding the arm in its horizontal position may be provided. In the present instance 21 is a bolt for that purpose arranged in a bore 22 of the head and normally urged by a spring 23, interposed between abutments of the head and bolt, respectively, toward the arm. The latter has at its pivoted end a cam surface 21a to be wiped by the adjacent end of the bolt when the arm moves toward and from horizontal position and a notch 21b to receive the bolt when the arm is quite in such position. The other end of the bolt protrudes from the head and may have on such end a knob 24; there may be another or substitute knob 25 on the bolt projecting laterally thereof through a slot 26 in the head.

To take a measurement the arm is raised and locked in its horizontal position. According as the customer wishes the trousers to hang long, medium or short, or a given distance from the floor so the auxiliary plunger is adjusted vertically to bring its appropriate scale index in register with the corresponding pointer. The customer then straddles the arm of the scale plunger which is raised to take the measurement. In noting the resulting measurement as indicated by the two pointers the tailor is protected against error since the critical points on the two scales are in close proximity to each other.

Having thus fully described my invention, what I claim is:

1. Apparatus for the purpose described including a fixed structure, a scale plunger movable up and down and guided by said structure and having a downwardly reading measurement scale, an auxiliary plunger movable up and down and guided by said structure and having a downwardly reading allowance scale, the auxiliary plunger having a pointer to coact with the scale of the scale plunger and the fixed structure providing a pointer to coact with the scale on the auxiliary plunger.

2. The combination of an up-and-down movable plunger having an up-and-down-extending scale, means relatively to which the plunger is movable including fixed structure for guiding the plunger, said means providing a pointer coactive with the scale on the plunger, an arm pivoted in the upper end portion of the plunger on a horizontal axis and movable from pendant to substantially horizontal position and back to pendant position, and a bolt movable in the plunger into the path of movement of the arm toward pendant position when the arm is in horizontal position and thereby adapted to hold the arm in such horizontal position.

JAMES TURPAN.